United States Patent [19]

Kamijima

[11] Patent Number: 5,321,677
[45] Date of Patent: Jun. 14, 1994

[54] HIGH-SPEED SEARCH APPARATUS FOR USE WITH A VIDEO DISK PLAYER

[75] Inventor: Yoshihiro Kamijima, Saitama, Japan

[73] Assignee: Pioneer Electronic Corporation, Tokyo, Japan

[21] Appl. No.: 15,050

[22] Filed: Feb. 8, 1993

Related U.S. Application Data

[63] Continuation of Ser. No. 561,562, Aug. 2, 1990, abandoned.

[30] Foreign Application Priority Data

Sep. 7, 1989 [JP] Japan .................................. 1-232098

[51] Int. Cl.⁵ .............................................. G11B 7/00
[52] U.S. Cl. .................................. 369/33; 360/14.1; 358/342
[58] Field of Search ............... 369/47, 50, 32, 33; 360/10.1, 10.2, 10.3; 358/342

[56] References Cited

U.S. PATENT DOCUMENTS 4,549,234  10/1985  Sakamoto .................. 360/77.13
4,769,721   9/1988  Kajiura ........................ 369/47

FOREIGN PATENT DOCUMENTS 0090379   10/1983  European Pat. Off. .
3500521A1  7/1985  Fed. Rep. of Germany .
2071392A   9/1981  United Kingdom .
2145544A   3/1985  United Kingdom .

Primary Examiner—Aristotelis Psitos
Assistant Examiner—P. W. Huber
Attorney, Agent, or Firm—Foley & Lardner

[57] ABSTRACT

A high-speed search apparatus for use with a video disk player, which is adapted to retrieve any position where desired information is recorded while moving an information reading point at high speed in a radial direction of a video disk. This apparatus is characterized by counting pulses generated in proportion to the rotation of a movable member such as a rotary knob, etc., determining the amount of displacement of the information reading point, on the basis of the thus-counted value, and then displacing at high speed the information reading points by said amount of displacement.

5 Claims, 4 Drawing Sheets

HIGH-SPEED SEARCH APPARATUS FOR USE WITH A VIDEO DISK PLAYER

This application is a continuation of application Ser. No. 07/561,562, filed Aug. 2, 1990, now abandoned.

BACKGROUND OF THE INVENTION

1) Field of the Invention

The present invention relates to a high-speed search apparatus for use with a video disk player.

2) Description of the Related Art

As an example of search method for accessing any position on a moving video disk for a video disk player, where desired information to be retrieved is recorded, by moving an information reading point of a pickup in a radial direction over the video disk at high speed, there is a known method described below. When an address indicated by a frame number or the like, representing a position where desired information has been recorded, is designated as a target address and a high-speed search command is issued, as illustrated in the timing chart of FIG. 1, the information reading point is moved at high speed until it passes the target address (period a). When the information reading point is moved beyond the target address, the direction of the movement is reversed so that the information reading point is moved at high speed in the opposite direction (period b). When it passes the target address again, the direction of the movement is reversed again and the velocity of the movement is lowered (period c). When the information reading point passes the target address, a servo loop of a slider bearing the pickup is closed for reading the address, and a read-out address is compared with the target address (period d). At this time, the information reading point is moved beyond the target address as a matter of course. Therefore a jump command is issued repeatedly to cause the information reading point to jump back in the opposite direction (period e). When the information reading points moves across the target address, the servo loop of the slider is closed (period f), and thereafter a still picture is reproduced by performing a one-track jumping back of the information reading point.

In the conventional high-speed search method as described above, the information reading point is moved to a position adjacent to the target address at high speed and a modification operation to cause the present address to converge the target address is performed while reading the present address from the disk. Thus, the time required to perform the modification operation is relatively long, thereby posing a limitation in reducing the search time. It is also impossible to search a desired image while viewing images reproduced on a screen because the search operation is based on the comparison between the addresses referred to above by using designated target address.

On the other hand, in video reproducing apparatuses such as video tape recorders, video disk players, etc., a technique is employed in which rotary knobs called SHUTTLE ring and a JOG dial are provided concentrically so that the image reproduction speed or image reproducing position is controlled by means of the rotary knobs. With a shuttle reproduction operation using the SHUTTLE ring, a continuous image reproduction is performed at the reproduction speed depending on the angle of rotation of the SHUTTLE ring. Thus, this method is convenient for viewing an outline of information recorded on a video tape or a video disk over a wide range. On the other hand, with a jog reproduction operation using the JOG dial, a reproducing frame in the reproduction of a still picture is changed to an adjacent frame in response to the rotation of the JOG dial, and the image reproducing position is advanced in a fashion of the reproduction of the still picture and in proportion to the amount of rotation of the dial. Thus, this brings about good operational performance and is convenient for the recognition of details of an image.

Where high-speed search using the shuttle or jog reproduction operation, visibility of the image will be reduced since the reproduction is performed by images moving at high speed, causing a difficulty in recognizing desired images, during the execution of the shuttle reproduction operation. On the other hand, in the case of the jog reproduction operation, the high-speed search cannot be achieved over a wide range because the jog reproduction is performed by changing the reproducing frame to the adjacent frame repeatedly as in the reproduction of a still image.

OBJECT AND SUMMARY OF THE INVENTION

It is thus an object of the present invention to provide a high-speed search apparatus for use with a video disk player, by which the high-speed search can be performed over a wide range by turning a rotary knob as a movable member while viewing reproduced images.

According to one aspect of the present invention, there is provided a high-speed search apparatus for use with a video disk player, the apparatus being adapted to search any position where desired information is recorded, while moving the information reading point at high speed in a radial direction of a disk, the apparatus comprising:

a movable member;

means for generating pulses to a number corresponding the amount of movement of the movable member;

a counter for counting the pulses;

computing means for determining an amount of displacement of the information reading point on the basis of a count value of the counter; and high-speed displacing means for displacing the information reading point at high speed in a radial direction of the disk by the said amount of displacement.

The high-speed search apparatus of the present invention, which is suitable for use with video disk players, is characterized by counting the number of pulses generated depending on the amount of movement of the movable member, determining an amount of displacememt of the information reading point on the basis of the counted value, and then displacing the information reading point in the radial direction of the disk a high speed by the thus-determined amount of displacement.

The above and other objects, features and advantages of the present invention will become apparent from the following description and the appended claims, taken in conjunction with the accompanying drawings in which a preferred embodiment of the present invention are shown by way of an illustrated example.

DETAILED DESCRIPTION OF THE PREFERRED EMBODIMENT

A preferred embodiment of the present invention will hereinafter be described in detail with reference to the accompanying drawings.

Figure 1:
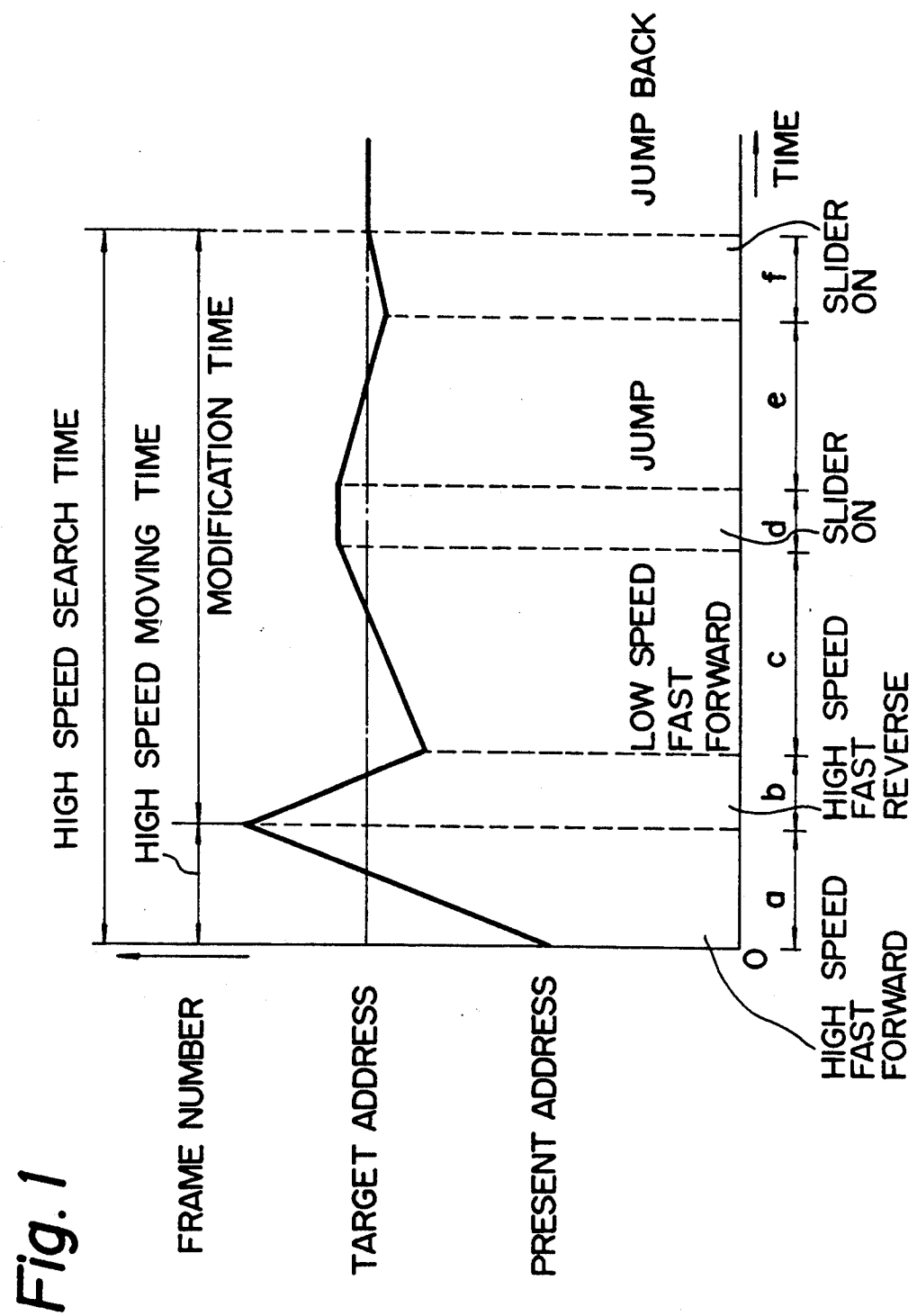
FIG. 1 is a timing chart for describing the procedure in a conventional high-speed search method.
Figure 2:
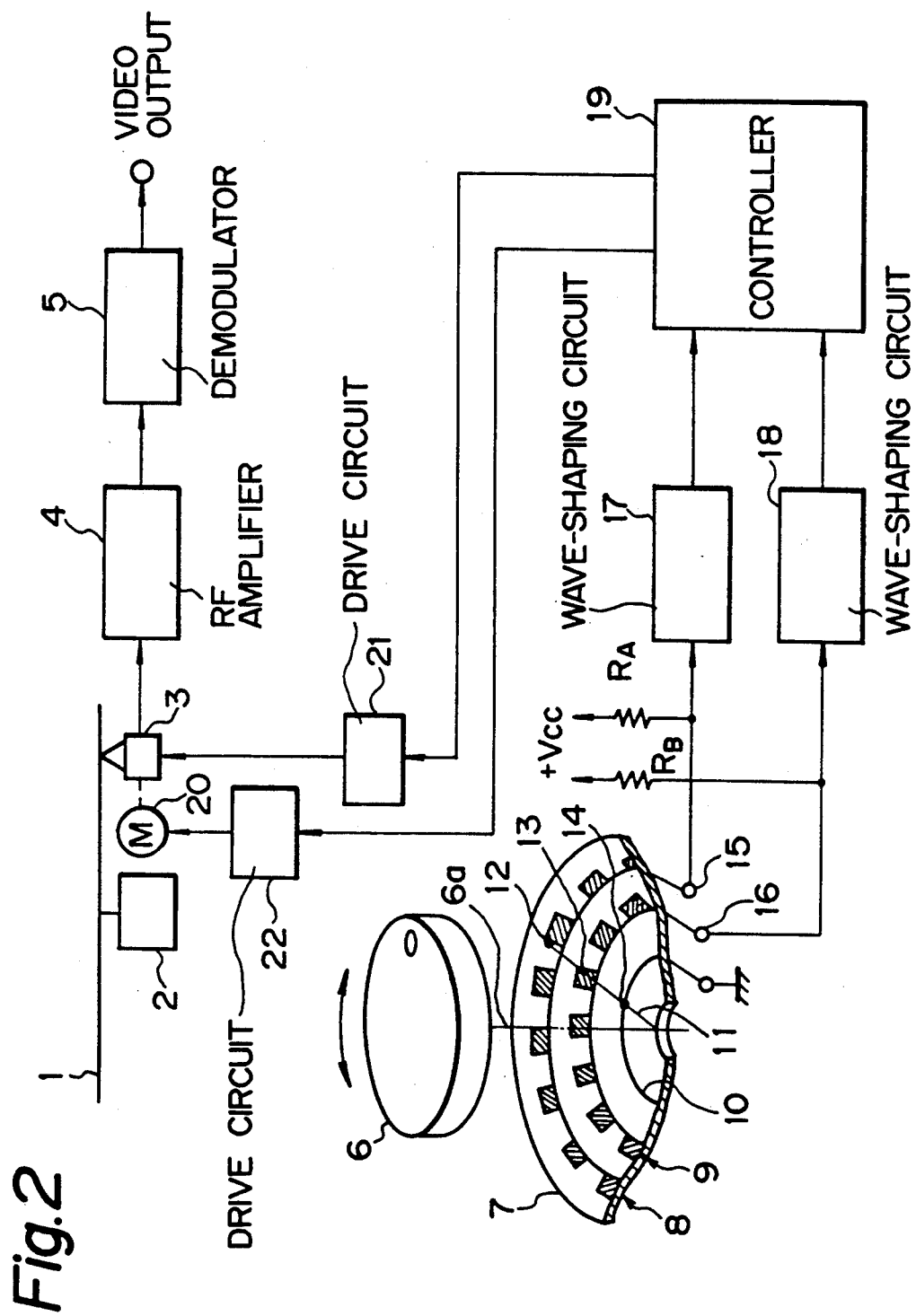
FIG. 2 is a block diagram showing one embodiment of the present invention.

FIG. 2 is a block diagram showing the embodiment of the present invention. In the same drawing, a video disk 1 is driven to rotate by a spindle motor 2 and information recorded on the video disk 1 is photoelectrically read by an optical pickup 3. The pickup 3 is provided to be linearly movable in a radial direction of the video disk 1, and mounted on a slider (not shown) in which a slider motor 20 in the form of, for example, a linear motor is employed as a drive source. Incorporated into the pickup 3 are an optical system including a laser diode, an objective lens, an optical detector for receiving a light beam reflected from the video disk 1, a focus actuator for positioning the objective lens in the direction of an optical axis thereof with respect to an information recording surface video disk 1, a tracking actuator for positioning a main beam spot (information reading point) of the pickup 3 in the radial direction of the video disk 1 with respect to the recording track. A read output signal from the pickup 3 is amplified by an RF amplifier 4 and demodulated by a demodulator 5, so that a video output is obtained from the demodulator 5.

A rotary knob, i.e., a so-called jog dial 6 as a movable member, which is used for the control of the direction of reproduction and of the speed of reproduction and for the high speed search, is rotatably provided in an operation part of a main body of a player or a remote control unit or of both of them. A substrate 7 is fixedly disposed coaxially with the jog dial 6. A plurality of conductors electrically connected to one another are provided on the substrate 7, and arranged concentrically at given angular intervals about a rotary shaft 6a of the jog dial 6 such that the width of each conductor is equal to the interval between adjacent two conductors. These conductors form an A-phase conductor group 8. Conductors of the same number as that of the A-phase conductor group 8, which are electrically connected to one another, are provided inside the inner periphery the A-phase conductor group 8. These conductors are arranged concentrically at given angular intervals such that the width of each conductor is equal to the, interval between each adjacent two conductors, thereby forming a B-phase conductor group 9. A phase difference corresponding to the electrical angle 90° is formed between the A-phase conductor group 8 and the B-phase conductor group 9. A source voltage +Vcc is applied to the A-phase conductor group 8 and the B-phase conductor group 9 through resistors $R_A$ and $R_B$ respectively. Further, a ring-shaped conductor 10 is provided concentrically inside the inner periphery of the B-phase conductor group 9 and the ring-shaped conductor 10 is grounded.

An actuator 11 is fixed to the rotary axis 6a of the jog dial 6 so thay it is rotatable with the jog dial 6. The actuator 11 is provided with brushes 12, 13 and 14 electrically connected to one another. By the rotation of the jog dial 6, the brushes 12 and 13 are brought into contact with each conductor of the A-phase conductor group 8 and each conductor of the B-phase conductor group 9 intermittently, whereas the brush 14 is always in contact with the conductor 10. Thus, waveforms, which are reduced to a ground level during the period in which the brushes 12, 13 respectively contact with each conductor of the A-phase conductor group 8 and each conductor of the B-phase conductor group 9, are obtained at output terminals 15, 16 for the A- and B-phases respectively by rotating the jog dial 6. These waveforms derived at the output terminals 15, 16 are wave-shaped by wave-shaping circuits 17, 18 so that pulses of two phases having a phase difference of electrical angle 90°, are supplied to a controller 19. Pulse generating means for generating pulses of two phases in response to the rotation of the jog dial 6 is formed by the elements described above.

The controller 19 is constituted by, e.g., a microcomputer, and includes a pulse counter for counting pulses delivered from the wave-shaping circuit 17 or 18. The controller 19 judges whether the operation mode of the jog dial 6 is a jog mode or a high speed search mode according to the number of pulses supplied from the wave-shaping circuit 17 or 18 within a predetermined time period from a start of the rotation of the jog dial 6 and performs the control operation depending on the operation modes.

Specifically, when the number of input pulses is less than a predetermined number (e.g., two), the operation mode is judged to be the jog mode. In the jog mode, the controller 19 sets a reproduction direction corresponding to the direction of the rotation of the jog dial 6 on the basis of the pulses of two phases and sets a reproduction speed corresponding to the rotational speed of the jog dial 6 on the basis of the number of input pulses per unit time, thereby to drive and control a drive circuit 21 for driving a tracking actuator (not shown) incorporated in the pickup 3. In video disk players, the direction of reproduction and the speed of reproduction are determined depending on the direction in which the spot of the main beam of the pickup 3 jumps, the timing of the jump and the number of jumped tracks.

On the other hand, when the number of input pulses exceeds a predetermined number, the operation mode is determined to be the high-speed search mode. In the high-speed search mode, the controller 19 counts the number of input pulses and multiplies the counted value with the number of frames to be traversed per pulse (one counted value), which have been determined previously, so as to determine the amount of displacement of the main beam spot, and performs a drive control of a drive circuit 22 for the slider motor 20 in order to displace the main beam spot in the radial direction of the video disk by the amount of displacement described above. The amount of displacement of the spot of the main beam is derived as the number of frames. In order to displace the spot of the main beam at high speed by the determined amount of displacement, it is only necessary to control the drive circuit 22 such that drive current corresponding to the amount of displacement flows through the liner motor, in the case where a linear motor having a good responsiveness is employed as the slider motor 20 by way of example. Incidentally, it is also possible to displace the main beam spot by a number of the tracks (in the case of CAV (constant angular velocity) disk, the number of the frames = the number of the tracks) corresponding to the number of the frames determined by counting the number of tracks which the main beam spot traverses during the high-speed displacement.

Figure 3:
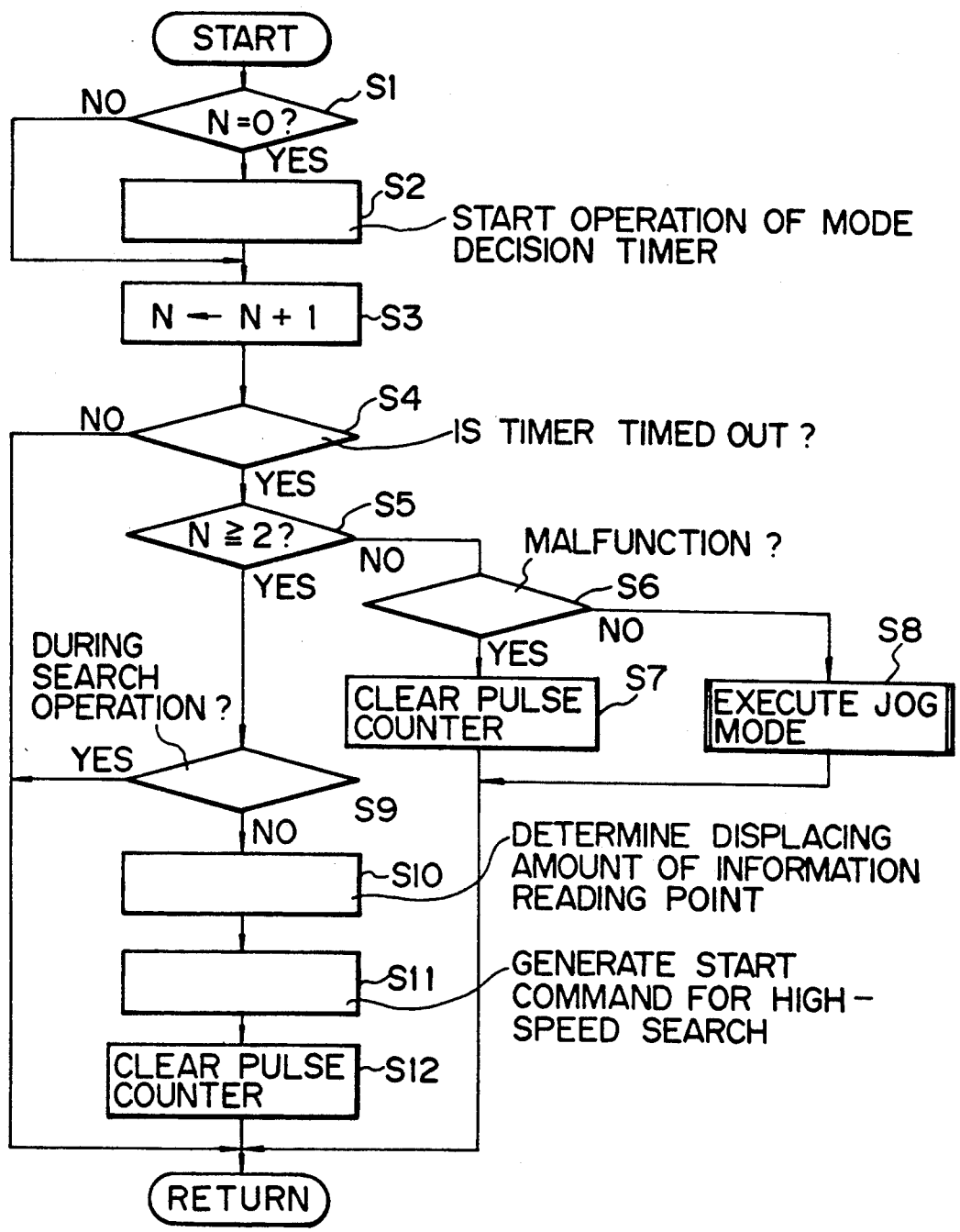
FIG. 3 is a flowchart for describing the procedure for a high-speed search mode which is to be executed by a precessor in a controller.

A description will next be made on the procedure of the high-speed search mode which is executed by a processor in the controller 19, in accordance with the flowchart of FIG. 3 while referring to the timing chart of FIG. 4. Incidentally, the present subroutine will be executed immediately when it is called by an interruption caused by the input of pulses in response to the rotation of the jog dial 6 during the execution of a main routine. The apparatus operates in the same manner both in the forward and backward directions. Therefore the description will be made only for the forward direction and the description of the operation in the backward direction will be omitted.

At first, the processor judges whether or not a count value N of the pulse counter is 0. If N=0, the precessor judges that the pulse input at the present time is an initial pulse generated in response to the rotation of the job dial 6, and starts a mode decision timer (step S2). The mode decision timer is a timer used for determining the mode in a manner that the operation mode is determined to be the jog mode when no incoming pulse appears within a predetermined period of time after the input of a pulse and determining the operation mode is to be the high-speed search mode when it receives the second pulse or more pulses within the predetermined period of time subsequent to the input of a first pulse. In addition, this mode decision timer also functions as a timer for judging that the first pulse is a false pulse produced by a malfunction of the jog dial 6, which is caused by vibrations or the like when no incoming pulse appears within the predetermined period of time. This mode decision timer times up, for example, about 300 milliseconds.

When it is judged in Step S1 that N≠0, the pulse input at the present time is the second pulse or a pulse after the second pulse. Therefore, the processor will increase the value N counted by the pulse counter by 1 in Step S3. During this operation, the mode decision timer, which has already been started, continues the counting operation. Then, in Step S4, the processor judges whether or not the mode decision timer has timed-out. If the mode decision timer has not yet timed-out, the processor returns to the main routine in order to wait the input of the following pulse. On the other hand, where it has timed-out, the processor judges in Step S5 whether or not any incoming pulse appeared subsequent to the first pulse, i.e., whether or not the count out value N of the pulse counter is equal to or greater than 2, with the period of time timed by the mode decision timer.

If N=1, the processor judges that the jog mode is to be performed or a malfunction of the job dial 6 has occurred. Then, in Step S6, the processor performs a judgement between the jog mode and the malfunction of the jog dial 6 depending on whether or not the input pulse is of an abrupt nature. The method for determining whether or not the input pulse is of an abrupt nature is known in the art and its description will therefore be omitted. If the input pulse is produced abruptly, the processor judges that a malfunction of the job dial 6 has occurred, and clears the count value N of the pulse counter to "0" in Step S7. Then, the processor returns to the main routine in order to wait the input of the following pulse. If the input pulse is not of the abrupt mature, the processor judges in Step S8 that the jog dial 6 has been turned manually. Then, the processor executes the process of the jog mode and thereafter, returns to the main routine. As described above, during the jog mode, the controller sets the direction of reproduction corresponding to the direction of rotation of the jog dial 6 on the basis of the pulses of two-phases and establishes the reproduction speed corresponding to the rotational speed of the jog dial 6 on the basis of the number of input pulses per unit time, thereby to perform the drive control of the drive circuit 21.

When it is judged in Step S5 that N≧2, the processor judges that the mode of operation is a high-speed search mode. Then, the processor will check in Step S9 whether or not the drive circuit 22 has completed the previous high-speed search operation. If the drive circuit 22 is still performing the high-speed search operation and a still picture is not yet obtained, the processor returns to the main routine in order to wait the input of the following pulse. In general, there is often a case where the jog dial 6 is turned continuously even in the course of the previous search operation. Thus, a routine in which the program returns to the main routine from Step S9 is cyclically performed for plural times to accumulate pulses generated within a period of the previous search operation.

When it is judged in Step S9 that the previous search operation has been completed, the processor reads out the count value N of the pulse counter and multiplies the count value N by the number of frames to be traversed per pulse (one count value), which has been set previously, so as to calculate the amount of displacement of the main beam in Step S10. Then, the processor supplies a start command signal for the high-speed search to the drive circuit 22 of the slider motor 20 in order to displace the main beam spot by this amount of displacement in the radial direction of the video disk, and clears the count value N of the pulse counter to "0" in Step S12. Thereafter, the processor returns to the main routine in order to wait for the input of the following pulse.

Figure 4:
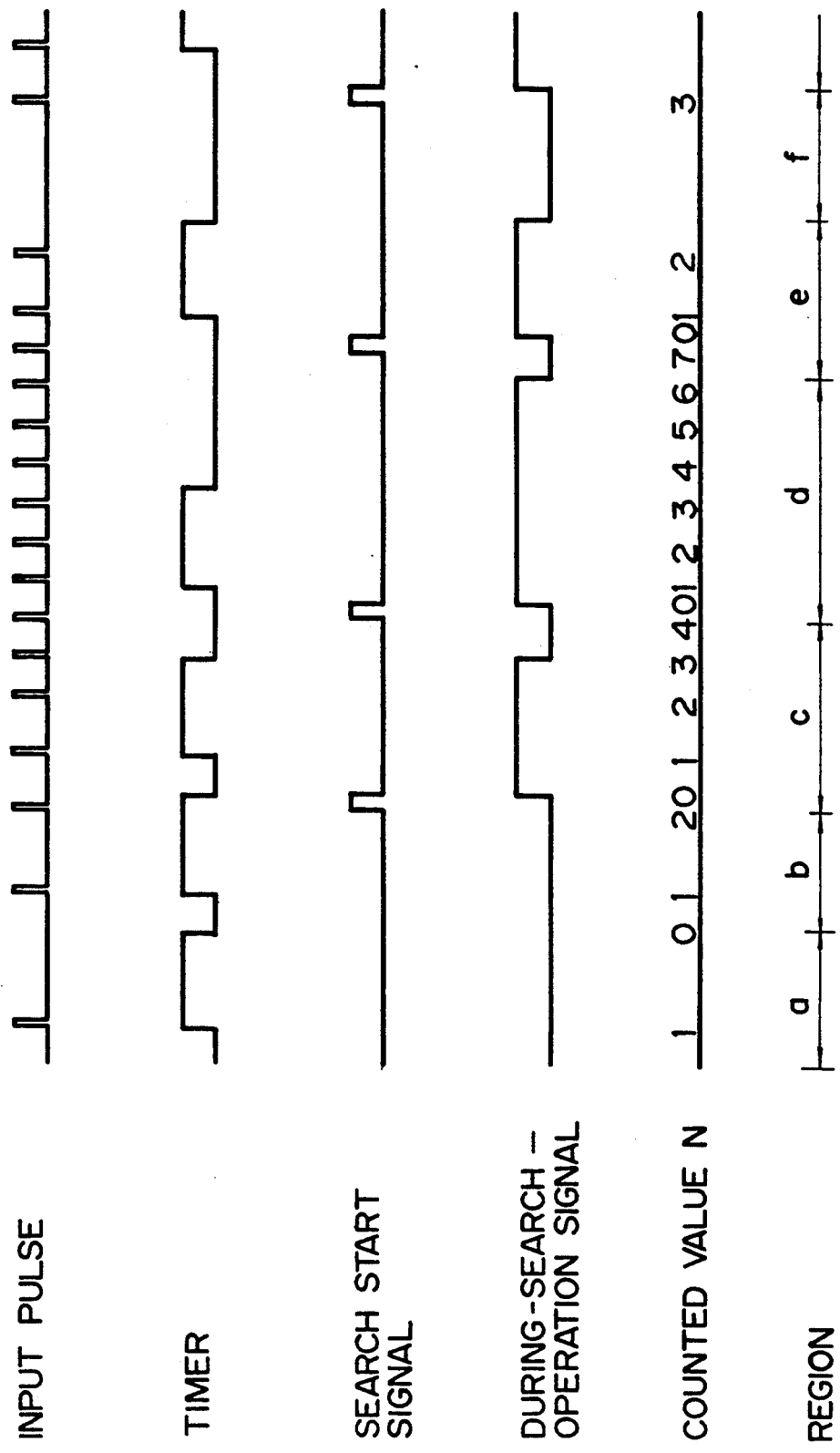
FIG. 4 is a timing chart illustrating the procedure of FIG. 3.

By the execution of the above-descrived processing, if the time interval of the input pulse is broader as represented by a region a in FIG. 4, the high-speed search operation is not executed as a result of the judgement of the normal jog mode or the malfunction of the jog dial 6. On the other hand, if the jog dial 6 is rotated continuously as in regions c, d and e, the next high-speed search operation is started by the initial pulse input after the completion of the high-speed search operation, whereby the high-speed search operation is performed continuously. If the movement of the jog dial 6 is stopped after completion of the search operation as in a region f, a still picture corresponding to a desired frame number is obtained. When the jog dial 6 is turned again, it is possible to change from the previous operation to the next high-speed search operation immediately by using the previously input value. In addition, even in the case where the time required for the previous high-speed search operation is longer than a normal value, the pulses input during the high-speed search are not neglected depending on the operation time of the drive system because the pulse input during the high-speed search operation is used for the next high-speed search.

Incidentally, in the above-described embodiment, a description has been made on the case where one rotary knob (jog dial 6) as a movable member is employed in common for the jog mode and the high-speed retrieval mode. Needless to say, it may be applied only to the high-speed retrieval mode. In such a case, the mode decision timer functions only as a timer for the prevention of malfunction of the jog dial 6.

With the high-speed search apparatus of the present invention, for use with the video disk player, as has been described above, the number of pulses corresponding to the amount of movement of the movable member is counted and the amount of displacement of the information reading point is determined on the basis of the count value, thereby to move at high speed the information reading point in the radial direction of the video disk by the thus-determined amount. Thus, the speed of the jog mode reproduction, which is performed in the conventional jog mode, is increased and the amount of the movement in the movable member is made to correspond with the amount of displacement of the information reading point. Thus, the high-speed search can be performed over a wide range by rotating, for example, the rotary knob as the movable member, while viewing reproduced images, in a manner in which the search operation is performed in harmony with the feel of operation.

Having now fully described the invention, it will be apparent to those skilled in the art that many changes and modifications can be made without departing from the spirit or scope of the invention as set forth herein.

What is claimed is:

1. An apparatus for use with a video disk player, said apparatus being adapted to search any position on a disk where desired information is recorded, said apparatus comprising:
    an information reading point, said information reading point being moved in a radial direction on said disk, wherein said information reading point includes an optical pickup;
    a movable member for controlling the position of said information reading point;
    means for generating a number of pulses corresponding to an amount of desired displacement of said information reading point based on movement of said movable member;
    a counter for counting said pulses;
    computing means, said computing means including a processor for determining whether said movable member is to be placed in a jog mode or a high-speed search mode according to said amount of desired displacement of said information reading point on the basis of a count value of said pulses generated in a predetermined period of time and counted by said counter, wherein said processor multiplies said count value by a predetermined number of frames to be traversed per pulse to determine said amount of desired displacement in said high-speed search mode and wherein, in said jog mode, reproduction speed is determined based on a rotational speed of said movable member, determined by the number of said pulses per unit time;
    means for displacing said information reading point at one of a relatively low speed in a jog mode and a relatively high speed in a high speed search mode to thereby displace said information reading point in the radial direction of the disk by said amount of desired displacement.

2. An apparatus as claimed in claim 1, further comprising detection means for detecting whether or not said pulses are generated more than a predetermined number within a predetermined time period after a start of movement of said movable member, and wherein said computing means determines said amount of desired displacement when it is detected by said detection mean that said pulses are generated more than the predetermined number.

3. An apparatus as claimed in claim 1, wherein said counter performs the counting even when said information reading point is displaced by said means for displacing, and said computing means determines said amount of desired displacement immediately after a completion of the displacement of said information reading point by said means for displacing.

4. An apparatus as claimed in claim 1 wherein said means for generating a number of pulses includes:
    a substrate fixed with said movable member about a rotary axis of said movable member,
    a first group of conductors arranged concentrically around said rotary axis at a first angular interval on said substrate,
    a second group of conductors arranged concentrically inside said first group around said rotary axis at a second angular interval on said substrate,
    a ring shaped conductor, disposed concentrically inside said second group around said rotary axis on said substrate, and
    a plurality of brushes electrically connected to one another, one for being in contact with said first group, one for being in contact with said second group and one for being in contact with said ring shaped conductor.

5. A method of searching a position on a disk where desired information is recorded, with an apparatus including an information reading point, said information reading point being moved in a radial direction on said disk, wherein said information reading point includes an optical pickup and a movable member for controlling the position of said information reading point, the method comprising the steps of:
    generating a number of pulses corresponding to an amount of desired displacement of said information reading point based on movement of said movable member;
    counting said pulses in a counter;
    determining in a computing means whether said movable member is to be placed in a jog mode or a high-speed search mode according to said amount of desired displacement of said information reading point on the basis of a count value of said pulses generated in a predetermined period of time and counted by said counter;
    in said high speed search mode, multiplying said count value in said computing means by a predetermined number of frames to be traversed per pulse to determine said amount of desired displacement;
    in said jog mode, determining reproduction speed based on a rotational speed of said movable member; and
    displacing said information reading point at one of a relatively low speed in said jog mode and a relatively high speed in said high speed search mode to thereby displace said information reading point in the radial direction of said disk by said amount of desired displacement.

* * * * *